United States Patent

Voigtlaender-Tetzner

[15] 3,658,428
[45] Apr. 25, 1972

[54] METHOD AND APPARATUS FOR MEASURING A DIMENSION OF AN OBJECT

[72] Inventor: Gerhard Voigtlaender-Tetzner, Leverkusen-Schlebusch, Germany

[73] Assignee: Exatest Messtechnik GmbH, Leverkusen, Germany

[22] Filed: Feb. 24, 1970

[21] Appl. No.: 13,411

[30] Foreign Application Priority Data

Feb. 25, 1969 Germany..................P 19 09 294.5

[52] U.S. Cl...................356/167, 250/219 WD, 250/236, 350/7, 356/160
[51] Int. Cl. ..........................................G01b 11/02
[58] Field of Search ..............356/160, 163, 167; 250/219 S, 250/219 WD, 219 LG, 236; 350/7

[56] References Cited

UNITED STATES PATENTS

| | | | |
|---|---|---|---|
| 3,384,753 | 5/1968 | Ravesz | 250/236 |
| 2,791,931 | 5/1957 | Summerhayes, Jr. | 356/160 |

*Primary Examiner*—Ronald L. Wibert
*Assistant Examiner*—Jeff Rothenberg
*Attorney*—William R. Sherman, Stewart F. Moore and Jerry M. Presson

[57] ABSTRACT

A method of measuring a linear dimension of an object which includes generating a plurality of parallel, spaced-apart sight lines of the object dimension. The lines, in effect, rotate around different centers of rotation contained within a plane which extends substantially parallel to that portion of the object the dimension of which is under measurement. Plural object images defined by the rotating sight lines are converted into two electrical signals having durations corresponding to the angle circumscribed by the sight lines scanning the object dimension; the electrical signals being displaced in the time domain relative to one another by a time interval which is a function of the distance between said centers of rotation. A representative dimensional parameter for said object dimension is obtained by dividing said time interval and the time duration of one of the two electrical signals. One advantage of the disclosed method is that the accuracy of measurement is practically independent of the distance between the centers of sight line rotation and the object. Various embodiments of apparatus for performing the method are also described.

10 Claims, 7 Drawing Figures

PATENTED APR 25 1972 3,658,428

INVENTOR.
Gerhard Voigtlaender-Tetzner

BY *[signature]*
ATTORNEY

METHOD AND APPARATUS FOR MEASURING A DIMENSION OF AN OBJECT

This invention relates to an optical method of measuring a linear dimension of an object, such as its width or its diameter.

Such methods are used in steel mills or in wire mills in order to control the calibration of the width of the strip or the diameter of the wire produced, from the measurement of the relevant dimension. For this purpose, it is known to use a contactless method in which an image of the object to be measured is periodically reflected onto a lens by means of a rotating mirror, this image being occulted except in a portion defined by the axially symmetrical aperture of a diaphragm associated with the lens, this portion being applied to a photoelectric detector disposed behind the diaphragm. Under these conditions, the object is scanned by a narrow optical line of sight, and pulses of duration dependent on the angle scanned by the line of sight are generated by the detector, in response to the changes of luminous intensity at the edges of the object. The duration of these pulses is then processed so as to furnish the dimension sought. This known method suffers from a disadvantage: the duration of the pulses generated depends on the distance between the lens and the object. To a first approximation, and within certain limits, a modification of 1 percent in the distance corresponds to a change of 1 percent in the value measured.

An attempt has been made to eliminate this error by using for the scanning of the object, luminous rays which travel along a path exactly perpendicular to the edges defining the linear dimension to be measured. To this end, use has been made either of a parabolic mirror at the focus of which the periodic scanning device (rotating polygonal mirror) was disposed, or of detectors collimated so as to follow the edges, and disposed in a plane parallel to the plane of the object. But these two methods require equipment whose size and cost price are prohibitive.

An object of the present invention is to propose a method for measuring a linear dimension of an object in which the linear dimension measured is independent of the distance of the object from the measuring device.

Another object of the present invention concerns a device for carrying out the above method, which does not require complex or large apparatus, and in which the processing of the signals obtained can be achieved by means of relatively simple electronic circuits.

BRIEF DESCRIPTION

According to one aspect of this invention, a method is disclosed whereby the linear dimension of the object to be measured is additionally scanned by a second line of sight parallel to the first. The center of rotation of this second line is spaced from that of the first by an essentially constant distance considered along a straight line parallel to the dimension under measurement. Two identical optical detectors are used which generate two primary measurement pulses of the same duration shifted from one other in time. These pulses are processed so as to generate rectangular measurement pulses of durations respectively proportional to the two angles of sight. Two secondary signals respectively representative of the dimension of the object and the spacing between the centers of rotation of the lines of sight are generated from the durations of one of the two shaped measurement pulses on the one hand and from their shift in time on the other hand. A quotient between these secondary signals is then calculated, this quotient being proportional only to the dimension to be measured.

As will be explained in detail hereafter, such a method permits a signal to be obtained which is exactly proportional to the linear dimension measured. It will be appreciated that the duration of one of the primary measurement pulses and the duration of their shift in time are affected in the same manner by the distance from the object to the centers of rotation of the lines of sight, so that the quotient of the secondary signals obtained from these durations, for correcting the non-linearity which generally affects the duration-dimension relationship, becomes independent of this distance.

In the frequent case in which the dimensions to be measured are sufficiently small so that the arc of the angle of sight is approximately equal to its tangent and consequently equal to the linear dimension measured, the method according to this invention can be simplified considerably.

According to the invention for small angles of sight, instead of generating the secondary signals from the duration of one of the shaped measurement pulses and from the duration of their shift in time, the quotient of these durations is directly formed, so that this quotient is directly proportional to the dimension to be measured.

One of the applications of this particular case is the measurement of the diameter of a wire.

An apparatus for carrying out the methods according to this invention comprises two devices, respectively opticomechanical and electrical. In order to generate the two lines of sight having centers of rotation spaced apart by s fixed distance, the apparatus according to this invention is characterized in that it comprises two superimposed polygonal mirrors, rotating about a common axis and driven by a common motor, these mirrors having parallel faces respectively disposed at two different distances with respect to the axis of rotation.

In the apparatus described, a very small error is produced, but the apparatus has the great advantage of requiring only a single driving motor so that the parallelism and the synchronism of the two lines of sight result automatically from the construction and are thus always guaranteed.

For the generation of the secondary signals representative of the dimension of the object and of the spacing of the centers of rotation of the lines of sight, from the duration of the shaped measurement pulses and from their shift, the apparatus is characterized in that it comprises means for generating at least one auxiliary line of sight along a path parallel or symmetrical to the principal lines of sight, this auxiliary line of sight scanning a graduated luminous band extending parallel to the linear dimension to be measured and generating a sequence of primary reference pulses at the output of an auxiliary photoelectric detector in response to the number of graduations of the scale scanned. In this apparatus, the scanning of the graduated scales take place in synchronism with the scanning of the object and each pulse produced corresponds to a certain length, for example, one centimeter, scanned on the object. The intervals between the reference pulses vary with the angle of sight but the number of these reference pulses corresponds exactly to the tangent of the angle of sight as is desired. Such a transformation can obviously be achieved by electro-mechanical generators, or others, delivering pulses, these generators being coupled to the shaft of the motor driving the mirrors. The processing of the electric signals thus generated is achieved in a current whose constitution varies according to whether the tangent error is considered or not.

The characteristics and advantages of the invention will appear more clearly from the description given hereafter solely by way of non-limiting example with reference to the accompanying drawings in which.

Figure 1:
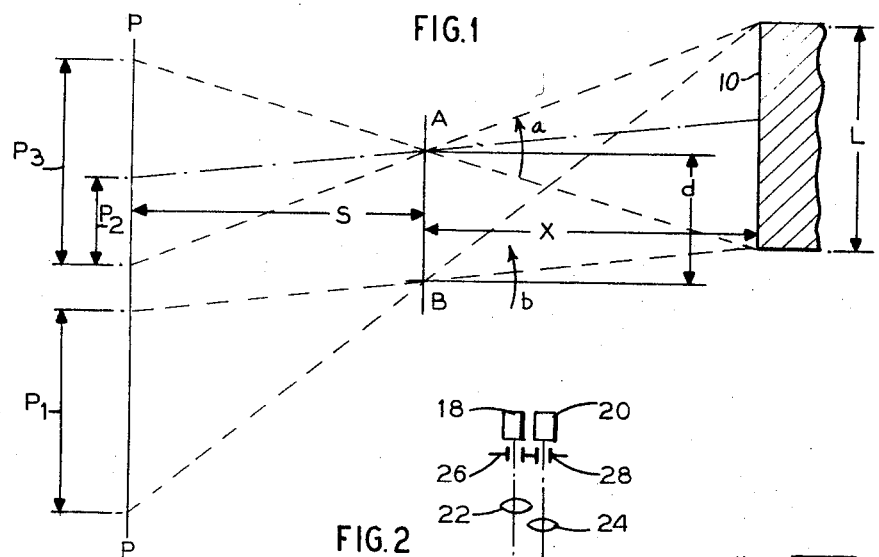
FIG. 1 shows a schematic diagram of the geometrical relationship explaining the method of measuring linear dimensions according to this invention.

In FIG. 1, the object 10 is indicated by cross-hatching, and its width L is to be measured. The centers of rotation of the two principal lines of sight are assumed to be situated at points A and B and these lines of sight form images of the object 10 in the image plane PP. The centers A and B are spaced apart by a distance $d$ and are disposed on a straight line parallel to the linear dimension L and to the plane PP. The distance between the object 10 and each of the points A and B is $x$. The distance between the image plane PP and the points A and B is $s$. The relationships between the terms L, $d$, $s$, and $x$ would be similar if the centers of rotation of the lines of sight generated by a rotating double polygonal mirror were placed at the points A and B, which centers form images of the linear dimension L at each detector. The axis of time of the output pulses of the detector (primary pulses) would then be equivalent to the image plane PP. In this case however, the duration of the primary pulses obtained depends directly on the angle of sight wereas the value desired is the tangent of this angle of sight.

The magnitude of the images $p_1$ and $p_3$ is in the case of the Figure given by the equations:

$$p_1 = p_3 = sL/x \quad (1)$$

In order to show the relationships more clearly, the respective final positions of the various lines of sight are drawn in broken lines.

A portion of $p_2$ is cut off on the image $p_3$ by a line of sight (drawn in broken lines) parallel to the final position of the line of sight which passes through point B; the magnitude of the image $p_2$ is consequently given by the relationship:

$$p_2 = (L - d) s/x \quad (2)$$

The arrows $a$ and $b$ show the direction of the rotation of the lines of sight, that is to say the direction of the rotation of the polygonal mirrors. According to the invention, the ratio is taken between the duration of one of the generated primary pulses and the duration of the shift between these pulses. The image $p_2$ corresponds to the interval of time common to the two primary pulses, the shift from one pulse to the other being $(p_1 - p_2)$. The linear dimension L to be measured is proportional in the value $p_1/(p_1 - p_2)$.

Equations 1 and 2 give:

$$p_1 / (p_1 - p_2) = L/d$$

Since $d$ is a constant, a total proportionality is obtained. It can also be seen that neither the distances $s$ nor $x$, nor the position of the object in its plane with respect to the points A and B have the least effect on the measurement made, as long as the parallelism is maintained, which can easily be achieved in practice.

Figure 2:
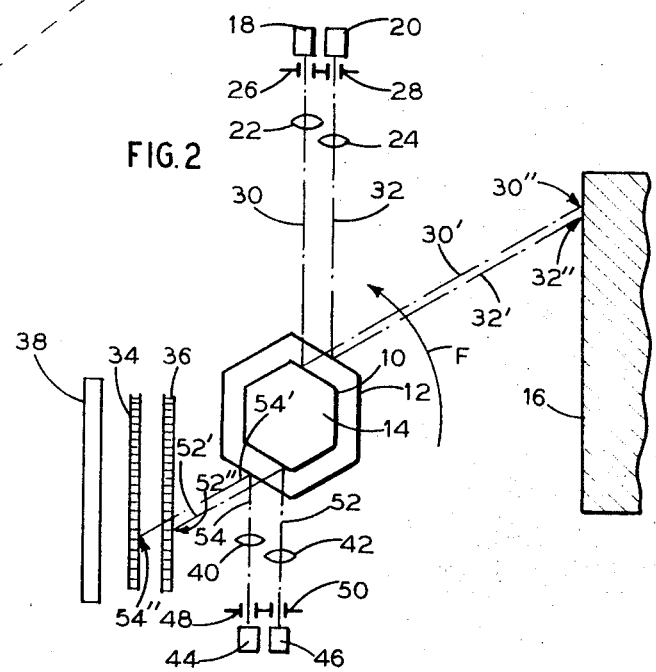
FIG. 2 shows schematically an apparatus for carrying out the measuring method according to the invention.

FIG. 2 shows how the geometrical principle explained hereabove can be put into practice. The two rotating polygonal mirrors 10 and 12 are driven by a motor 14 in the direction of the arrow F. The faces of the mirrors reflect an image of the object onto two lenses 22 and 24 respectively. The image portions that pass through the diaphragms 26 and 28 are applied to detectors 18 and 20, such that the parallel lines of sight 30 and 32 can be considered as rotating in synchronism. In the position of the mirrors shown, the lines of sight 30 and 32 reflect, along the paths 30' and 32', the points 30'' and 32'' of the object. As will be apparent, if the object itself radiates light energy for example, infrared radiation, two beams of infrared radiation define the two lines of sight whereas if the object is illuminated on its back surface by, for example, a glow tube (not shown), the two shadows cast by the object define the two lines of sight. Manifestly the detectors may be selected to respond appropriately to either one of these conditions. The lines of sight have been shown placed at a very small distance from one another so as to clarify the Figure. In practice however, they are superimposed in a plane parallel to the axis of the rotating mirror.

The primary pulses generated by the two detectors 18 and 20 have a duration proportional to the angle of sight during the scanning of the width of the object. They can be processed in an analogue manner by using an appropriate circuit for generating a value proportional to the dimension L of the object 16, as will be explained hereafter with reference to the circuit of FIG. 3 in the case in which the width is sufficiently small so that the tangents of the angle of sight are approximately equal to the arc.

However in the embodiment shown in FIG. 2, a device is provided by means of which the transformation of the angles of sight into digital signals proportional to the tangent of the angles of sight will be achieved. For this purpose, transparent screens 34 and 36 comprising graduated scales, are placed facing the polygonal mirrors 10 and 12 on the opposite side from the object 16. The screens are illuminated on their rear part by means of a lamp 38. The image of the screens is processed by means of two auxiliary line of sight generators comprising lenses 40 and 42 respectively, luminous detectors 44 and 46 and diaphragms 48 and 50. The conjugated auxiliary lines of sight 52 and 54 are exactly parallel to the principal lines of sight 30 and 32 and they form, from the incident luminous beams 52' and 54' respectively, images of the graduated scales. In the position shown for the mirrors 10 and 12, the points 52'' and 54'' of the graduated scales are scanned. It will be appreciated that at the output of the light detectors 44 and 46, two series of reference pulses appear provided that the graduations of the scales 34 and 36 have a width sufficiently large for the detectors to be completely occulted when these graduations are scanned by the auxiliary lines of sight.

The spacing of the graduations of the scales 34 and 36 can be chosen in simple relation with the linear dimension to be measured, for example, so that the distance between each graduation of the scale corresponds to one unit of measurement, 1 centimeter or 1 millimeter for example. It will be noted that the interval between two pulsed luminous signals becomes smaller and smaller with the reduction of the angle between the lines 52 and 52' in accordance with the arc-tangent function such that the number of signals obtained is an exact measurement of the length of the scale itself and not of the angle of sight of this scale.

The scanning of the object 16 by means of the principal detectors 18 and 20 and the scanning of the graduated scales 34 and 36 by means of the auxiliary photoelectric detectors 44 and 46 takes place in synchronism. The output signals of the detectors 18 and 20 on the one hand and 44 and 46 on the other hand differ in that the detectors 18 and 20 each deliver a primary measurement pulse whose duration is a function of the angle of sight of the object whereas the pulsed light detectors 44 and 46 continually deliver series of reference pulses in accordance with the arc-tangent function. During the duration of the primary measurement pulses delivered by the detectors 18 and 20, the same optico-geometrical relationships exist between the lines of sight 30 and 52, 32 and 54, 30' and 52', and 32'' and 54'' respectively, such that the small variations in the distance $d$ introduced by variations of the angle of incidence of the lines of sight on the two polygonal mirrors 10, 12 are constantly compensated. This is why, instead of the primary measurement pulses effectively supplied by the detectors 18 and 20, the series of primary reference pulses supplied in synchronism by the auxiliary pulsed light detectors 44 and 46 will be processed. Moreover, if the duration of the primary measurement pulses supplied by the principal detectors 18 and 20 is affected by the speed of rotation of the mirror, the number of pulses appearing in the sequences of primary reference pulses supplied at the output of the auxiliary detectors 44 and 46 is not affected. Only the period of these reference pulses varies.

As will be explained hereafter, the period of the reference pulses does not play any role in the processing which is applied to them.

The processing applied according to the present invention, to the primary measurement pulses and to the primary reference pulses will now be explained with reference to FIGS. 3, 4 and 5.

Figure 3:
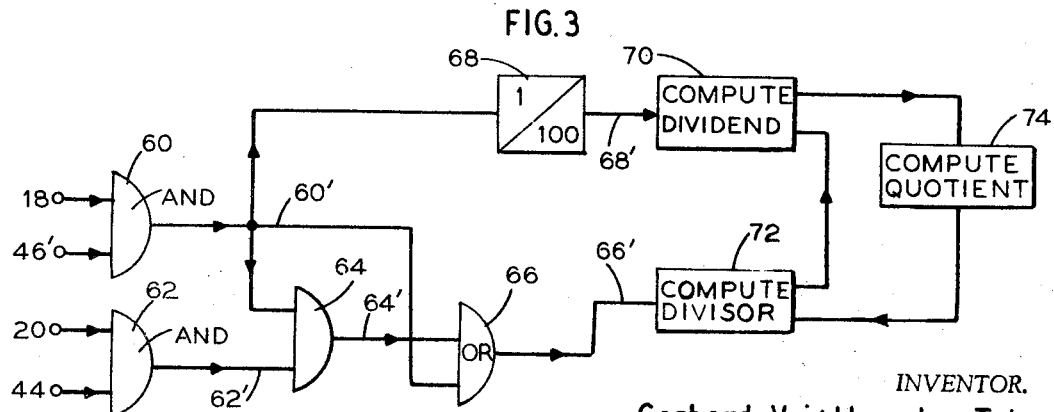
FIG. 3 shows a block diagram of a circuit for carrying out the method, when the apparatus of FIG. 2 is used.
Figure 4:
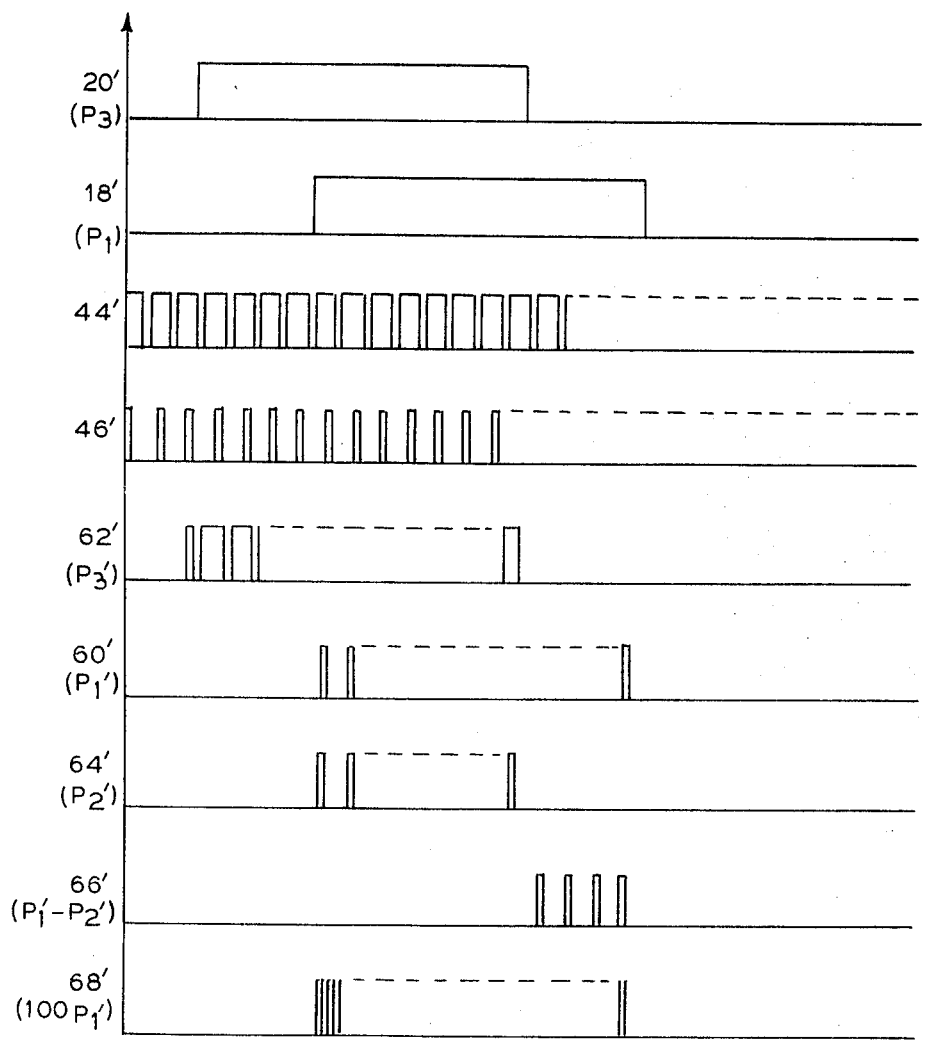
FIG. 4 shows pulse diagrams explaining in detail the operation of the processing circuit shown in FIG. 3.
Figure 5:
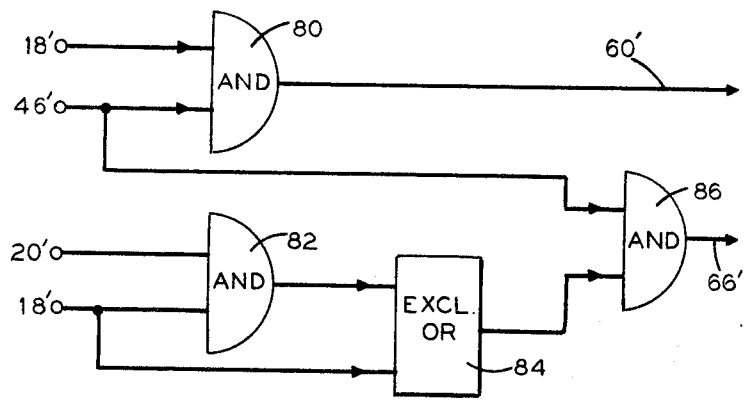
FIG. 5 is a modification of one part of the circuit of FIG. 3.

FIGS. 3, 4 and 5 complete one another, and, in FIG. 4, the variable distances which appear between the reference pulses due to the arc-tangent transformation are not shown for the sake of simplicity.

The primary measurement pulses delivered by the detectors 18 and 20 are amplified and shaped by known means. In this manner shaped measurement pulses, of rectangular form, 18' and 20' respectively, are obtained. The pulse 18' corresponds to $p_1$ whereas 20' corresponds to $p_3$. They are shifted in time such that the shaped pulse 20' leads the pulse 18' in phase. First of all the transformation of the shaped measurement pulses 18' and 20', whose durations are proportional to the angles of sight of the object, into digital values which depend on the length of the object is accomplished by the fact that the pulses 18' and 20' are respectively applied to one input of the AND gates 60 and 62, to the other input of which are respectively applied the shaped reference pulses 46' and 44' obtained after amplification and shaping the primary reference pulses delivered by the auxiliary detectors 46 and 44. Under these conditions, at the output of the AND gates 60 and 62, two sequences of secondary pulses 60' and 62' are produced respectively during the durations of the two shaped measurement pulses 18' and 20', the sequences of secondary pulses 60' and 62' (Cf. FIG. 4) being the digital values $p_1'$ and $p_3'$ of the tangents of the angles of sight of the measured dimension, obtained respectively from the shaped measurement pulses.

In order to furnish the digital value $p_2'$, the sequences of secondary pulses 60' and 62' are each addressed to one input of an AND gate 64 at the output of which a sequence of pulses 64' will consequently be produced, during the time during which the two shaped measurement pulses 18' and 20' are present. The sequence of pulses 64' is consequently a digital value $p_2'$ of $p_2$ as appears immediately with reference to FIG. 1. In each series of shaped reference pulses the ratios of the pulse width and the period are chosen different so as not to obtain either doubling or elimination of pulses at the output of the AND gate 64 and thus to have maximum reliability.

Other possibilities exist for completely eliminating this danger, for example by regulating the phase relationship between the two sequences of shaped reference pulses 44' and 46' one with respect to the other or again by applying the shaped measurement pulses 18' instead of the pulses 60' to the input of the AND gate 64.

The sequences of pulses 64' and 60' are then applied to the inputs of an exclusive OR gate 66 whose output terminal thus delivers a sequence of secondary pulses 66' which corresponds to the interval of time during which the pulses 60' are applied alone to the gate 66. The number of pulses of the sequence 66' is thus proportional to the distance $d$ since the sequence of pulses 66', as will easily be understood, is the difference between the digital values $p_1'$ and $p_2'$.

By way of a modification, only a single auxiliary line of sight could be used and only the series of reference pulses 46' generated. In this case, according to FIG. 5, a series of secondary pulses 60' is formed by applying to an AND gate 80 the shaped measurement pulses 18' and the shaped reference pulses 46'. The second series of secondary pulses 66' is for example generated from a first AND gate 82 to the two inputs of which are applied the shaped measurement pulses 18' and 20', the output of this AND gate 82 and one of the other of the pulses 18' and 20' being applied to an exclusive OR circuit 84 whose output signal, which is a pulse of duration proportional to the shift between the measurement pulses, is applied to an input of a second AND gate 86 whose other input receives the reference pulses 46'. At the output of this second AND gate 86 is obtained the series of secondary pulses 66'.

In order to effect a division between the numbers of secondary pulses 60' and 66', the sequence of pulses 60' is first of all multiplied by an arbitrary constant factor (100 for example) by means of a pulse multiplier referenced 68 in FIG. 3, of known type, so as to obtain a more precise value for the quotient desired, which in the case of the digital value indicated, can also be easily obtained by shifting towards the right the weight of the digits supplied.

To calculate the quotient itself, a digital counter is provided which comprises two registers 70 and 72, the first for the value of the numerator and the second for the value of the denominator. The sequence 68' of pulses of the numerator and the sequence 66' of pulses of the denominator are each counted in their respective register. As a consequence by using a suitable control circuit 74, the count of the register 72 of the denominator is deducted from the contents of the register 70 of the numerator, and this is repeated as many times as are necessary for the register 70 of the numerator to become finally empty. The number of repetitions gives directly the desired quotient such that the control circuit 74 can be provided with an indicator giving the number of repetitions as the indication of the desired value. It is of course possible to use other multiplication factors so as to give a direct measurement of the final value of the linear dimension sought, in usual units of measurement.

The circuit arrangement shown in FIG. 3 can be appreciably simplified if the difference between the arc of the angle of sight and its tangent is negligible. In this case, the circuit can then function in an analogue manner.

The AND gates 60 and 62 can be eliminated because they are superfluous, as well as the sequences of reference pulses. The formation of the difference $(p_1 - p_2)$ is accomplished in the same manner as has been explained above, by means of the AND gate 64 which receives the shaped measurement pulses 18' and 20' and the exclusive OR gate 66 which receives the pulse 64' and one or the other of these measurement pulses. The secondary signal 66' is not in this case a sequence of pulses but a single pulse.

Instead of a pulse multiplier 68, a known circuit for expanding the pulse duration can be used if necessary and the quotient can be directly detected. For this purpose, the pulse duration can be transformed into analogue voltage values respectively proportional to the numerator and the denominator of the quotient to be calculated, and these voltages can be applied to a quotient meter of known type so as to give a direct indication of the measurement sought. Of course it is also possible to chop the output pulses of the gates 64 and 66 by means of a suitably chosen frequency and to form the quotient of the numbers of pulses thus produced by using the same means as shown in FIG. 3.

Figure 6:
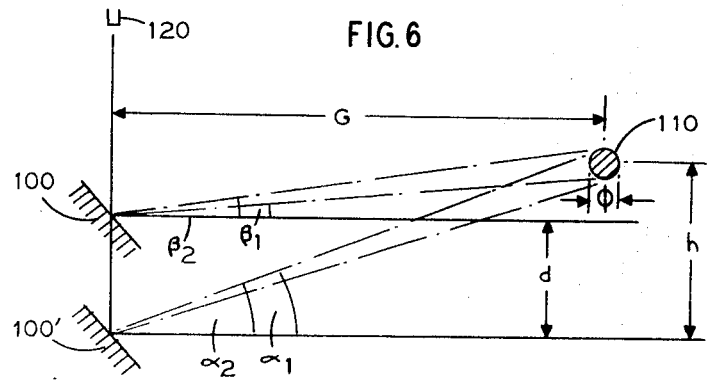
FIG. 6 shows schematically the geometrical relationships explaining the method used for the measurement of the diameter of a wire.

With reference to FIG. 6, the geometrical relationships will be explained in the case of the measurement of wire diameters. The optico-geometrical arrangement is similar to tat of FIG. 2. However in FIG. 5, only the faces of the mirror 100 and 100' are indicated and the lines of sight are shown in broken lines. The wire 110 whose diameter is to be measured is placed at a distance (variable) G from the measuring device and at a distance (variable) $h$ from a reference line of sight perpendicular to the line joining the detector 120 to the center of rotation of the mirror 100'.

By using this reference line of sight, artificial angles of sight $\alpha_1, \alpha_2$ and $\beta_1, \beta_2$ can be defined. Assuming that the tangents of the differential angles $(\alpha_2 - \alpha_1)$ on the one hand and $(\beta_2 - \beta_1)$ on the other hand are approximatively equal to the arcs of these angles, which is practically always the case when it is desired to measure the diameter of wires, the diameter $\phi$ of the wire is given by the relations:

$$\phi/d = (\alpha_2-\alpha_1)/(\alpha_1-\beta_1) \text{ or} = (\alpha_2-\alpha_1)/(\alpha_2-\beta_2)$$
$$\text{or} = (\beta_2-\beta_1)/(\alpha_2-\beta_2)$$
$$\text{or} = (\beta_2-\beta_1)/(\alpha_1-\beta_1)$$

In these equations, $d$ is the distance between the mirrors 100 and 100'.

Figure 7:
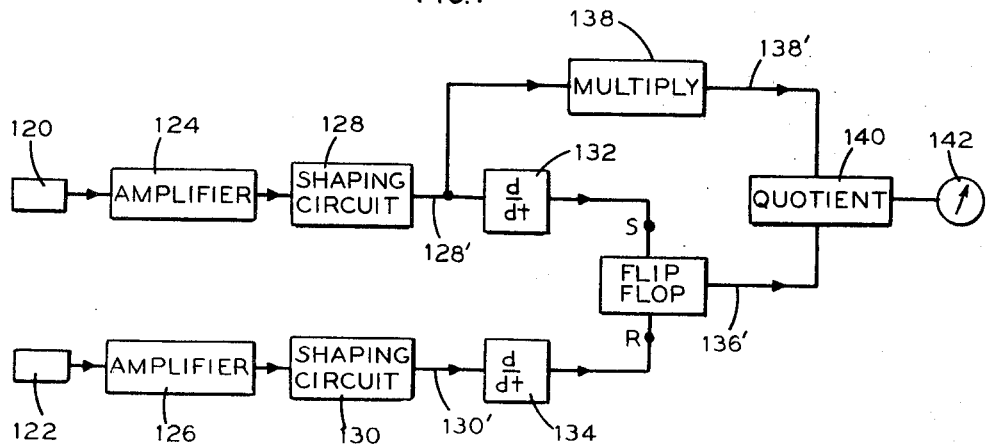
FIG. 7 shows the processing circuit used for the measurement of the diameter of a wire.

According to FIG. 7, the output signals of the detectors 120 and 122 are amplified at 124–126 and shaped into rectangular wave forms at 128–130. In this manner two shaped measurement pulses 128' and 130' are generated, their relative shift in time being greater as the distance $d$ is greater with respect to the diameter $\phi$ to be measured. By differentiation at 132–134 and selection of the positive signals, two pulses are generated which are synchronous with the leading edges of the primary measurement pulses 128' and 130'. By applying them to the reset R and set S terminals of a bistable flip-flop 136, a secondary pulse 136' is obtained at the output, representative of $(\alpha_1$ $-\beta_1$). The shaped measurement pulse 128' is applied to an expansion circuit 138 of known type, multiplying its duration by 100 for example. The quotient of the duration of the pulses 138' and 136' will then be obtained at 140 by known analogue or digital means, the value obtained, indicated at 142, being proportional to the diameter $\phi$ of the wire.

It will be noted that for the measurement of diameters of wires, optico-geometrical apparatus can be used which is identical to that used for measurement of lengths. In accordance with this invention, one can use, for measuring strip widths or wire diameters, a single common basic apparatus in combination with associated electronic circuits having relatively small differences.

It will be appreciated from the above description and from the accompanying drawings that the method according to this be can b put into practice by means of a relatively simple and compact apparatus and that the construction of the necessary electronic units does not present any particular difficulty. The complete equipment is very easy to use and it can in particular be used in difficult ambient conditions as is the case in steel mills, wire mills and textile and paper mills.

I claim:

1. A method of measuring a linear dimension of an object comprising the steps of, rotating plural parallel and spaced-apart sight lines around different centers of rotation in a direction generally parallel to said dimension, the centers of rotation being located substantially equidistances from that portion of the object of the dimension of which is under measurement along a line generally parallel to said dimension, generating two electrical signals of durations corresponding to respective time intervals during which each of said lines sights the object, the electrical signals being produced at different times and thereby being displaced in the time domain relative to one another by a time interval which is a function of the distance between said centers of rotation considered generally parallel to the object dimension, and computing a representative dimensional parameter for said object dimension from said time interval and the time duration of one of said two electrical signals.

2. A method of measuring a linear dimension of an object comprising the steps of, creating two incremental images of a portion of the object along the dimension to be measured, projecting the two incremental images via two reflective surfaces which are rotatable about an axis of rotation with one reflective surface radially displaced relative to the other along parallel radii about the axis of rotation, simultaneously rotating said reflective surfaces about said axis to cause said incremental images to scan across said object in the direction of said liner dimension to thereby create two composite images of said object, converting the composite images into two electrical pulses of corresponding pulse width, one of said pulses being delayed relative to the other by a time interval proportional to the image displacement of the two projected images, measuring the pulse width of one of the pulses to provide a the parameter of said object dimension, measuring said time interval to provide a time parameter of image displacement, and computing a dimensional parameter representative of said object dimension by dividing one of the time parameters by the other.

3. Method of measuring a linear dimension of an object, comprising: generating first and second rotating lines of sight for scanning the dimension to b measured, these two lines of sight being parallel to each other and having their centers of rotation spaced apart by a determined distance in a direction parallel to said dimension; scanning the object with said lines of sight; detecting the two images of said transmitted respectively by the scanning of these two lines of sight; generating from each said detection, a pulse burst consisting of a train of digital pulses, the value of said pulse burst being proportional to said dimension, the two pulse bursts being equal in value but having leading and trailing edges shifted in time by a time-shift which is substantially proportional to the spacing, in said direction parallel to said dimension, of the two centers of rotation at approximately the times said leading and trailing edges occur, the constant of proportionality of the time-shift to the spacing being the same as the constant of proportionality of the pulse bursts to said dimension, this common constant of proportionality being susceptible to vary from one measurement to another; and forming the quotient of one of the pulse bursts and of their time-shift to eliminate the common constant proportionality, this quotient then being proportional to the linear dimension to be measured, by a constant of proportionality that is less susceptible than said common constant of proportionality to vary from one measurement to another.

4. Method according to claim 3, in which the angle scanned on the object is sufficiently small to be approximated by its tangent, and wherein the first and second lines of sight scan the object at constant angular velocity, and wherein said pulse bursts are generated such that their value is proportional to the duration of the detection of the object images and hence proportional to the angle scanned and hence approximately proportional to the linear dimension to be measured.

5. Apparatus for measuring a linear dimension of an object comprising radiation-reflecting means for generating a plurality of parallel object sight lines spaced apart a substantially constant distance along a direction generally parallel to the object dimension under measurement, means for rotating said reflector means so that said sight lines sweep across the object in the direction of said dimension, means responsive to object images circumscribed by each of said lines for producing two electrical pulses of substantially equal time durations proportional to the object's dimension and time delayed relative to one another by a time interval proportional to the said distance between said lines, and means coupled to the pulse producing means for computing the magnitude of the object dimension from the time duration of said pulses and the time interval of the time delay.

6. Apparatus for measuring the dimensions of an article comprising, at least two elongated parallel radiation-reflective surfaces mounted for concentric rotation about an axis, said surfaces being spaced apart in the direction of said axis, and positioned different radial distances from said axis, means for concurrently rotating said surfaces about said axis, said surfaces being spaced from the article to reflect images of said article as said surfaces rotate through an arc, a plurality of matched radiation detectors mounted in juxtaposed relationship to receive said images from said surfaces and responsive thereto for producing sequential electrical pulses of pulse width corresponding to the angle circumscribed by said arc, said pulses being shifted relative to one another in the time domain by an amount determined at least in part by said radial distances, means for timing the pulse width of one of said elecrical pulses and of the amount of pulse shift, and means coupled to said means for timing for generating a quotient signal representative of the magnitude of said dimension from the time duration of said electrical pulse and the time interval of said pulse shift.

7. The apparatus as claimed in claim 6 which further comprises elongated illuminated scale means positioned generally parallel to the object dimension and including spaced-apart indicia representing article dimensions, third and fourth reflective surfaces positioned similar to said first and second surfaces respectively and mounted between said scale means and the article for rotation about said axis in synchronism with said first and second surfaces, said third and fourth surfaces facing said scale means when said first and second surfaces are reflecting said images of the article, and photoelectric detection means positioned to receive reflected images of said indicia for generating corrective electrical signals for the quotient signal generating means.

8. Apparatus for measuring the linear dimension of a radiating object comprising, two polygonal mirrors spaced from the object and mounted in juxtaposed relationship for rotation about a common central axis, said mirrors having mutually parallel radiation-reflecting surfaces disposed different radial distances from said axis, means for rotating said mirrors concurrently, and two radiation-responsive devices disposed adjacent one another and positioned to receive radiation from said object reflected by the reflecting surfaces of said respective mirrors, each of said devices producing an output pulse having a pulse width corresponding to the object dimension under measurement, one of said output pulses being time delayed relative to the other an amount corresponding to the said distance between said two reflecting surfaces, and means coupled to the outputs of said devices for computing the magnitude of the dimension from the pulse width of said one output pulse and the time delay thereof.

9. Apparatus for measuring a linear dimension of an object, comprising: means for generating a first and a second rotating line of sight for scanning the object along the dimension to be measured, these two lines of sight being parallel to each other and having their centers of rotation spaced apart by a determined distance in a direction parallel to said dimension; means for detecting the two images of said object transmitted respectively by these two lines of sight; means for generating, from each said detection, a pulse burst consisting of a train of digital pulses, the value of said pulse burst being proportional to said dimension, the two pulse bursts being equal in value but having leading and trailing edges shifted in time by a time-shift which is substantially proportional to the spacing, in said direction parallel to said dimension, of the two centers of rotation at approximately the times said leading and trailing edges occur, the constant of proportionality of the time-shift to the spacing being the same as the constant of proportionality of the pulse bursts to said dimension, this common constant of proportionality being susceptible to vary from one measurement to another; and means for forming the quotient of one of the pulse bursts and of their time-shift to eliminate the common constant of proportionality, this quotient then being proportional to the linear dimension to be measured, by a constant of proportionality that is less susceptible than said common constant of proportionality to vary from one measurement to another.

10. Apparatus according to claim 9, wherein said means for generating a first and a second line of sight comprise two plane, parallel, rotary mirrors rotatable about an axis which is perpendicular to said dimension and offset to the same side of both said plane mirrors, and wherein said means for detecting the two object images are directed respectively at said plane mirrors in directions parallel to the dimension to be measured.

* * * * *